US009533746B1

(12) United States Patent
Garrett

(10) Patent No.: US 9,533,746 B1
(45) Date of Patent: Jan. 3, 2017

(54) HUMAN POWERED WATERCRAFT PROPULSION DEVICE

(71) Applicant: Patrick D. Garrett, Spicewood, TX (US)

(72) Inventor: Patrick D. Garrett, Spicewood, TX (US)

( * ) Notice: Subject to any disclaimer, the term of this patent is extended or adjusted under 35 U.S.C. 154(b) by 0 days.

(21) Appl. No.: 14/983,820

(22) Filed: Dec. 30, 2015

(51) Int. Cl.
*B63H 16/20* (2006.01)
*B63H 5/14* (2006.01)
B63H 23/02 (2006.01)
B63H 21/30 (2006.01)
F16H 7/14 (2006.01)

(52) U.S. Cl.
CPC ............ *B63H 16/20* (2013.01); *B63H 5/14* (2013.01); *B63H 21/30* (2013.01); *B63H 2016/202* (2013.01); *B63H 2016/205* (2013.01); *B63H 2023/0216* (2013.01); *F16H 7/14* (2013.01)

(58) Field of Classification Search
CPC ..... F16H 7/14; B63H 2016/202; B63H 16/20; B63H 16/14; B63H 2016/085; B63H 2023/0208; B63H 2023/0216; B63H 20/02; B62M 9/16
See application file for complete search history.

(56) References Cited

U.S. PATENT DOCUMENTS

| 98,302 A | 12/1869 | Ross | |
| 397,282 A | 2/1889 | Frenzel | |
| 621,465 A | 3/1899 | Storms | |
| 667,036 A | 1/1901 | Provins | |
| 1,072,027 A * | 9/1913 | Mosteller | A63B 21/0084 440/29 |
| 1,411,540 A | 4/1922 | Szafka | |
| 1,701,381 A | 2/1929 | Marangoni | |
| 2,475,806 A * | 7/1949 | Simpson | B62M 9/16 280/288 |
| 2,627,243 A | 2/1953 | Stahmer | |
| 3,182,628 A | 5/1965 | Avellino | |
| 3,244,136 A | 4/1966 | Yarbrough | |
| 3,352,276 A | 11/1967 | Zimmerman | |
| 4,943,251 A | 7/1990 | Lerach | |
| 5,145,424 A | 9/1992 | Han | |
| 5,217,398 A | 6/1993 | Meron | |
| 5,374,206 A * | 12/1994 | Gregory | B63H 16/14 440/27 |

(Continued)

Primary Examiner — Andrew Polay

(57) ABSTRACT

An improved human powered watercraft propulsion device and mounting frame for attachment to existing pontoon watercraft. The propulsion device is light weight, self-contained, portable, has few moving parts made from corrosive resistant materials, and is propeller driven for quiet, efficient, and environmentally friendly underwater propulsion. Having a simple twisted belt configuration with an open structural design, all of the components are easily viewed and maintained by the user, as well as continuously cleaned, cooled, and lubricated by the water during operation, without the need for a sealed waterproof housing and internal oil bath. Hand knobs provide belt tensioning during operation and the device is adapted for operation by pedal, friction wheel, or direct chain drive. The device is adjustable on the attachment frame to fit the operator, pivots when beaching or striking an underwater object, and components such as pulleys and the propeller are changeable to achieve different power ratios.

9 Claims, 7 Drawing Sheets

(56) References Cited

U.S. PATENT DOCUMENTS

Figure 1:
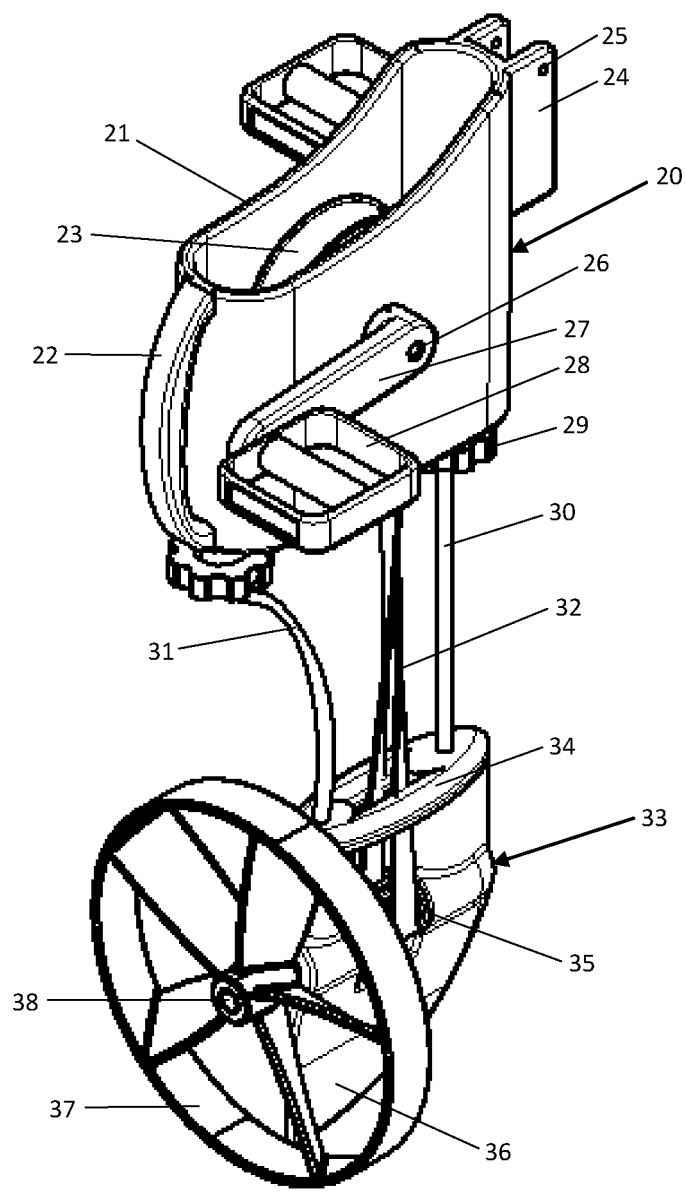

| | | |
|---|---|---|
| 5,405,275 A | 4/1995 | Schlangen |
| 5,413,066 A | 5/1995 | Spencer |
| 5,584,732 A | 12/1996 | Owen |
| 5,807,148 A | 9/1998 | Siviero |
| 6,165,030 A | 12/2000 | Lewis |
| 6,171,157 B1 | 1/2001 | Knapp |
| 6,712,653 B2 * | 3/2004 | Free .................. B63H 16/14 440/27 |
| 7,530,319 B1 * | 5/2009 | Ha ...................... B63H 25/46 114/151 |
| 8,342,897 B2 | 1/2013 | Gater |
| 8,668,536 B1 | 3/2014 | Burnham |
| 2008/0188146 A1 | 8/2008 | Howard |

\* cited by examiner

US 9,533,746 B1

HUMAN POWERED WATERCRAFT PROPULSION DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention relates to human powered watercraft propulsion devices, specifically portable, self-contained, pedal operated, belt driven units with hand adjustable belt tensioning that can be easily attached to small pontoon watercraft and water cycles to obtain forward and reverse water propulsion.

Inflatable pontoon fishing boats are plentiful and affordable in the marketplace. They are typically propelled by paddles, oars, kicking with foot fins, small electric trolling motors or small gasoline outboard motors. Human-powered watercraft propulsion devices are generally designed specifically for a particular watercraft, therefore, they are not easily attached to the wide variety of inexpensive inflatable pontoon boats and small watercraft available on the market.

Prior art reveals a variety of human powered watercraft propulsion devices. They are distinguished primarily by their design, portability, size, ease of use, connection to the watercraft, and the type of watercraft they are intended to fit.

U.S. Pat. No. 98,302 to Ross (1869), and U.S. Pat. No. 621,465 to Storms (1899), disclose a distributed system of pulleys and belts that require a lot of space on the watercraft. Both utilize a twisted belt design to transfer power from a crank shaft to a propeller shaft which have axes disposed at generally 90 degrees to each other. Ross (1869) uses hand cranks on a mono-hull boat, and Storms (1899) uses the foot pedals on a bicycle frame attached to a trimaran. Both systems are either permanently installed on a custom watercraft, or would require substantial effort and permanent modification of the watercraft to install. They are not easily portable or adaptable to other watercraft. Similarly, U.S. Pat. No. 5,807,148 to Siviero (1998), teaches a drive unit attached to the front of a bicycle on a pontoon boat driven by a flexible cable from a friction wheel in contact with the rear wheel of a bicycle. Though the drive unit itself is small, the entire system is very distributed and large. It requires a bicycle and a custom pontoon boat, so it is not easily portable to other pontoon watercraft. None of the above devices are self-contained or easily transferable to other watercraft.

U.S. Pat. No. 8,342,897 B2 to Gater and Banks (2013), reveals a similarly large, bulky, distributed system, but it is designed to be mounted in an existing canoe or similar type watercraft. The system includes a seat, frame, and attachment system, and utilizes a combination of twisted and non-twisted belts and a flexible shaft. It has many parts, is not easily removed, and not designed for attachment to a small pontoon watercraft.

U.S. Pat. No. 5,405,275 to Schlangen and Buresch (1995) and U.S. Pat. App. Publication No. US 2008/0188146 A1 to Howard and Wilcoxen (2008), disclose self-contained propulsion devices. They utilize non-twisted chain and bevel gears sealed inside a waterproof housing with an oil bath to lubricate the internal mechanisms. The device of Schlangen and Buresch (1995) is specifically fitted to its custom pontoon watercycle, and likewise, the device of Howard and Wilcoxen (2008) is specifically designed for and attached to its custom kayak. They are both designed to be attached specifically to their respective watercraft and are not easily removable or transferable to different types of watercraft without modification to the drive or watercraft. Their closed systems have many internal parts, are likely expensive to produce, require a waterproof sealed lining with an oil bath, cannot be visually inspected by the user without disassembly, and require periodic maintenance of the oil bath and internal components.

U.S. Pat. No. 6,712,653 B2 to Free (2004), is a self-contained, portable propulsion device utilizing a twisted chain configuration that is designed to be either enclosed in a housing or fully exposed and to be installed in a daggerboard fashion. It would likely require a custom boat or specific modification to the boat or drive unit to be installed, and is relatively complex with many moving parts.

In conclusion, in so far as I am aware, no human powered watercraft propulsion device formerly developed provides a portable, self-contained, removably attachable, efficient, and affordable water propulsion device for attaching to existing inflatable pontoon boats and other small watercraft.

ADVANTAGES

Accordingly several advantages of one or more aspects are as follows: an improved, self-contained, human powered watercraft propulsion device and mounting frame that can be readily attached to existing inflatable pontoon boats and other small watercraft. Having a simple, lightweight, portable design, and also having few moving parts, made with corrosive resistant materials including plastic, stainless steel, or aluminum. The propulsion device is durable, economical, and practical. Utilizing human power from the leg muscles, the user provides pedal operated, belt actuated, propeller driven, underwater propulsion that is quiet, efficient and environmentally friendly. The propulsion device employs a simple twisted belt configuration to compensate for the 90 degree difference in axial alignment between the drive shaft and the propeller shaft, and has an open architecture design allowing all of the components to be easily viewed, inspected, cleaned and maintained by the operator, as well as being continuously cleaned, cooled and lubricated by the water during operation. The open design with corrosive resistant components also alleviates the need for a watertight, sealed drive unit with an oil bath to lubricate internal drive components, like other prior art drive systems. The drive unit is small, self-contained, and provides forward and reverse propulsion. It pivots in an arc rearward and upward in case of contact with underwater obstacles, or in cases when it is desired to be lifted above the water by the operator. The propulsion device is customizable by changing the sizes of the pulleys or the size and design of the prop to achieve different gear ratios and thrust, or the length of the belt to change the overall height of the drive unit. A shrouded propeller offers improved thrust, strength, and safety, as an alternative to the sharp and exposed tips of standard bladed propellers. The attachment frame allows the propulsion device to be easily and securely mounted to commercially available pontoon fishing boats. The distance from the propulsion device to the boat seat, as well as the height of the device from the water is adjustable by the user for optimum placement and comfort. The propulsion device is adaptable to be driven by pedals, a sprocket for direct chain connection to a bicycle or other chain driven device, or by friction wheel from a bicycle wheel or other source. It can be placed on various types of watercraft in its various embodiments.

The result is a self-contained, human powered watercraft propulsion device that is adaptable and portable across multiple types of watercraft and overcomes many limitations of prior art to produce a simple, efficient and affordable means of water propulsion for recreation, sport and meaningful travel over the water.

Other advantages of one or more aspects will be apparent from a consideration of the drawings and ensuing description.

SUMMARY

In accordance with one embodiment a portable, self-contained, human powered water propulsion device for a variety of pontoon watercraft.

DRAWINGS

Figures

FIG. 1: Top right rear perspective view of propulsion device.

Figure 2:
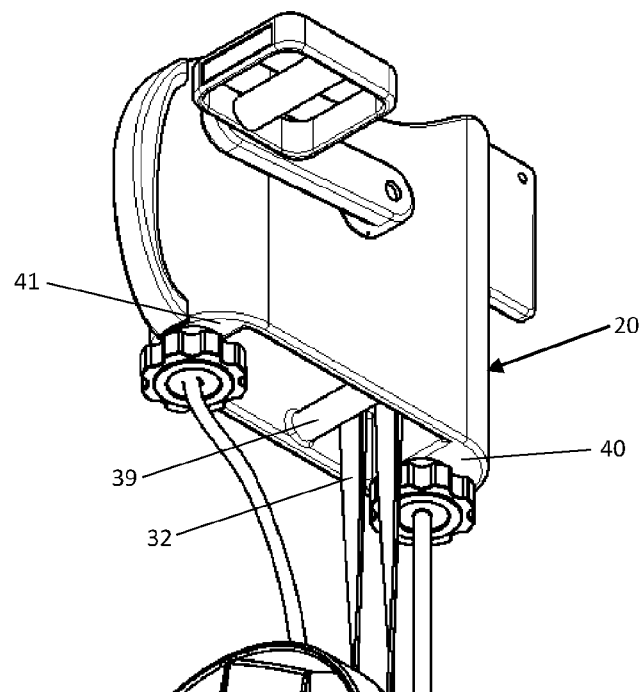

FIG. 2: Bottom right rear perspective view of upper housing.

Figure 3:
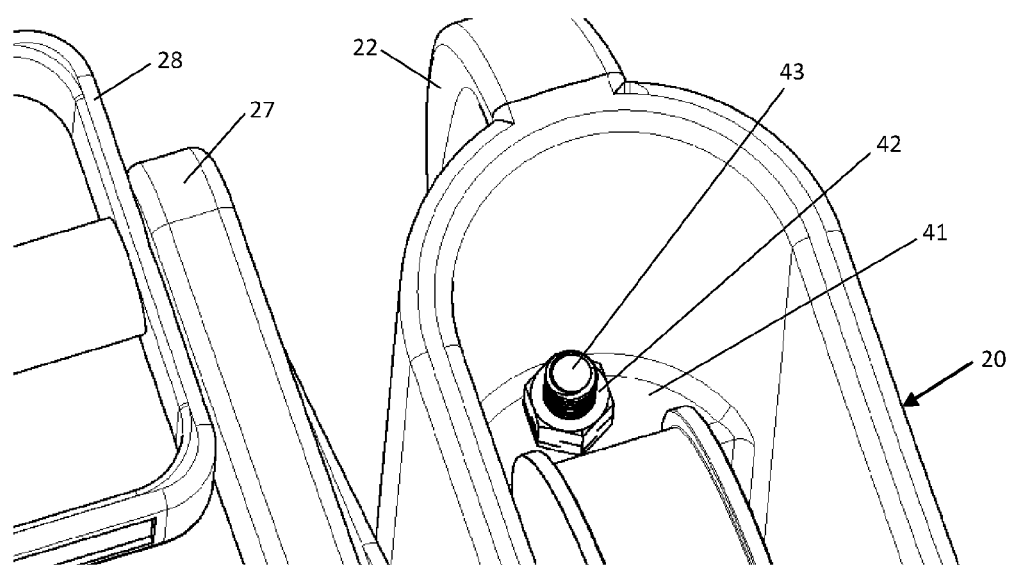

FIG. 3: Top right front perspective view of inside of upper housing.

Figure 4:
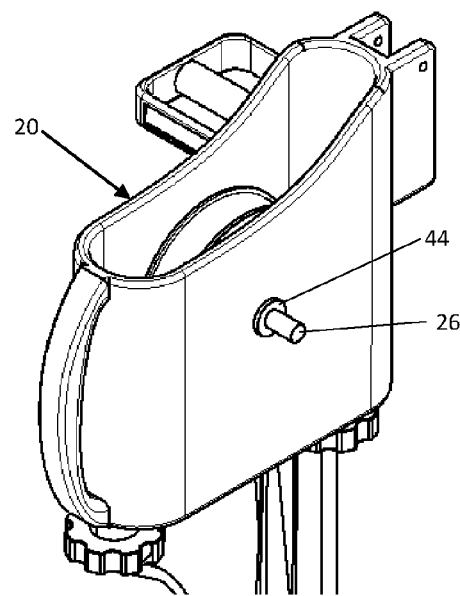

FIG. 4: Top right rear perspective view of upper housing with pedal and crank arm removed to show flanged sleeve bearing in the wall of upper housing with drive shaft running through it.

Figure 5:
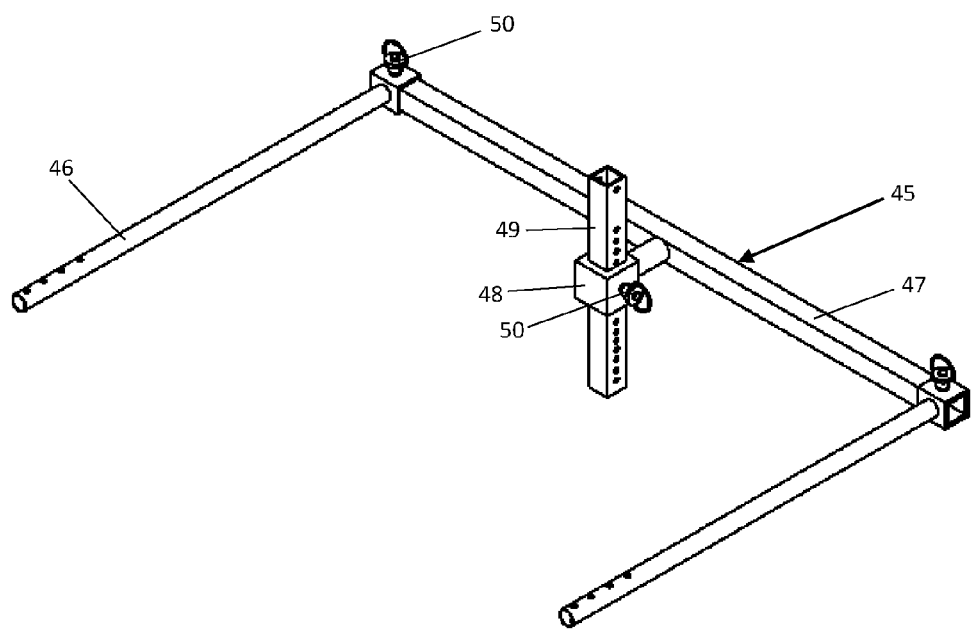

FIG. 5: Top right rear perspective view of attachment frame.

Figure 6:
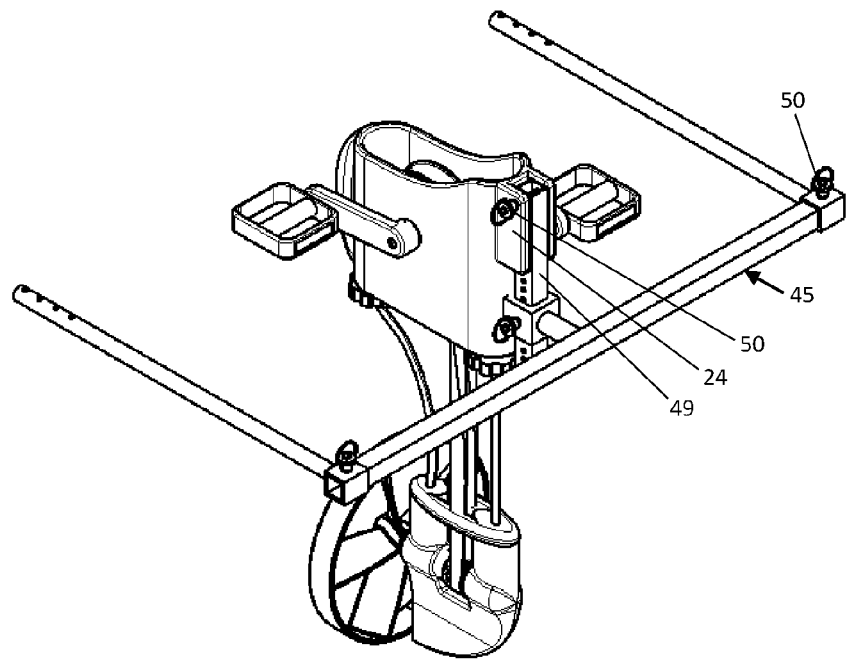

FIG. 6: Top right front perspective view showing propulsion device and attachment frame.

Figure 7:
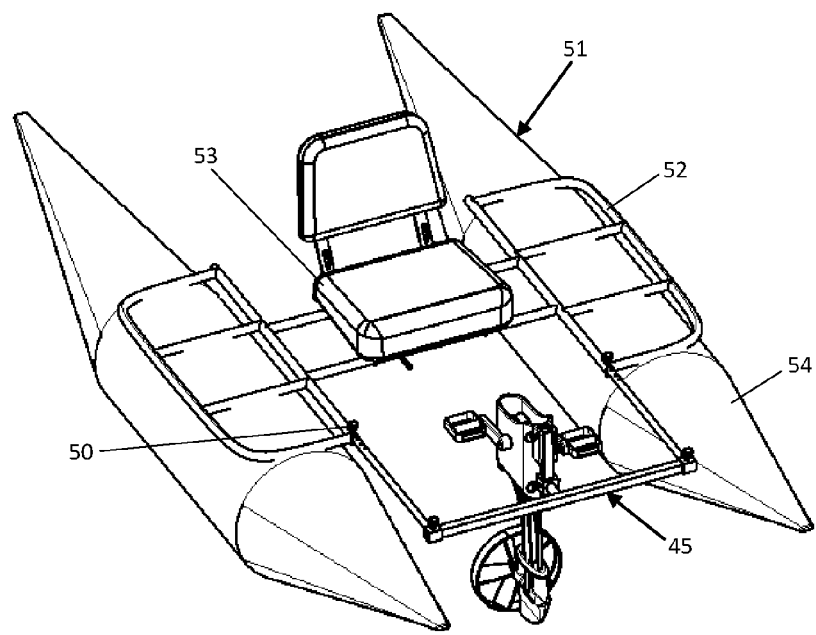

FIG. 7: Top right front perspective view showing propulsion device and inflatable pontoon boat.

Figure 8:
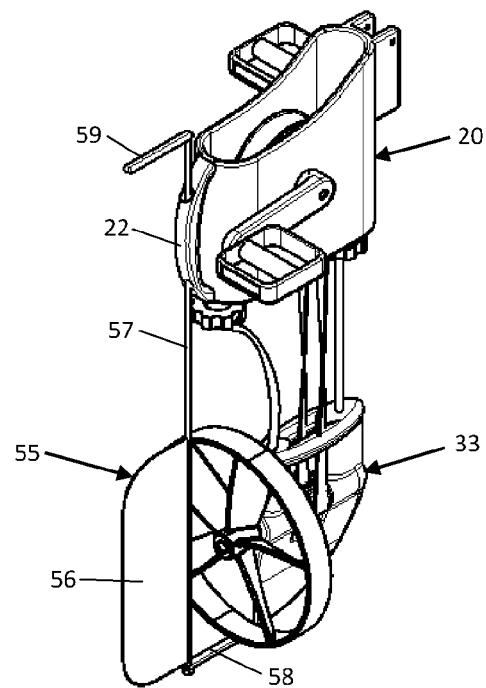

FIG. 8: Top right rear perspective view showing rudder attached to propulsion device.

Figure 9:
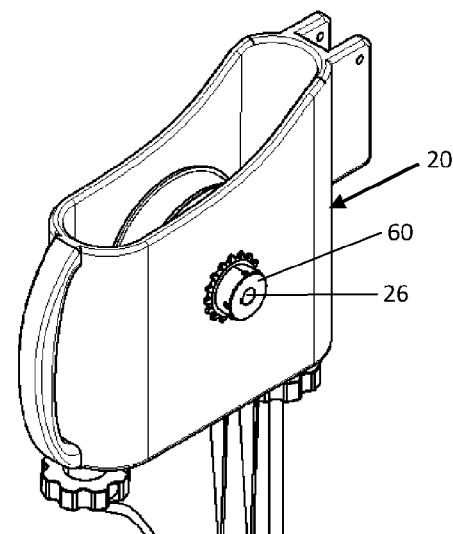

FIG. 9: Top right rear perspective view showing sprocket on drive shaft.

Figure 10:
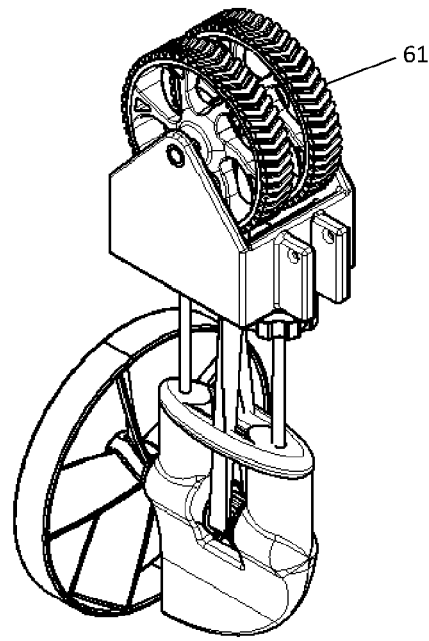

FIG. 10: Top right front perspective view showing two spaced apart friction wheels.

Figure 11:
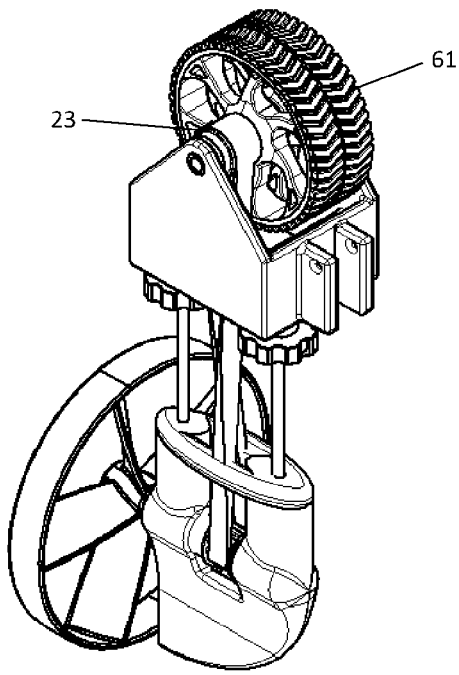

FIG. 11: Top right front perspective view showing side-by-side friction wheels.

Figure 12:
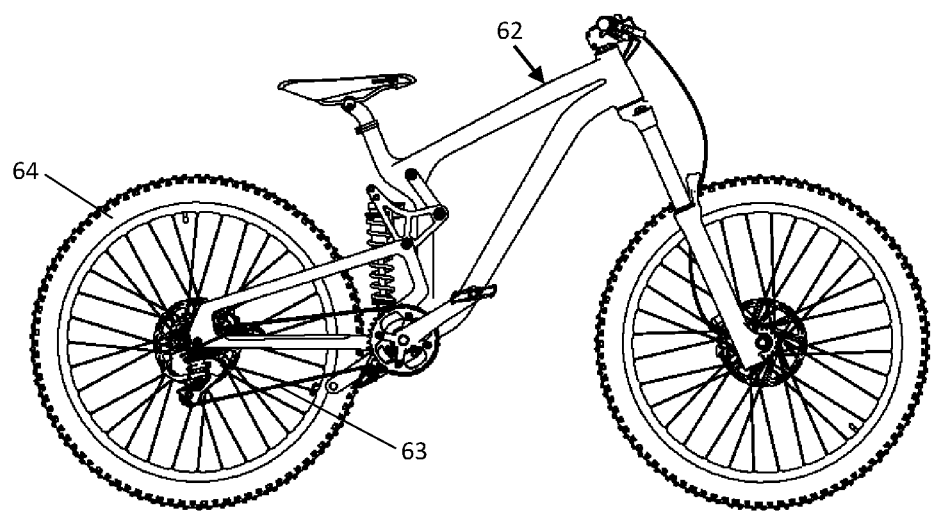

FIG. 12: Right side view of a bicycle.

| DRAWINGS - REFERENCE NUMERALS | | | |
|---|---|---|---|
| 20 | Upper Housing | 21 | Upper Housing Shell |
| 22 | Handle | 23 | Upper Pulley |
| 24 | Channel | 25 | Pivot Pin Hole |
| 26 | Drive Shaft | 27 | Crank Arm |
| 28 | Pedal | 29 | Thru Knob |
| 30 | Front Adjusting Tube | 31 | Rear Adjusting Tube |
| 32 | Endless Loop | 33 | Lower Unit |
| 34 | Belt Restrictor | 35 | Lower Pulley |
| 36 | Skeg | 37 | Propeller |
| 38 | Propeller Shaft | 39 | Belt Guide |
| 40 | Front Tube Support | 41 | Rear Tube Support |
| 42 | Locknut | 43 | Threaded End |
| 44 | Flanged Sleeve Bearing | 45 | Attachment Frame |
| 46 | Boat Frame Extension Tube | 47 | Cross Bar |
| 48 | Adjusting Bracket | 49 | Lift Tube |
| 50 | Pin | 51 | Pontoon Boat |
| 52 | Boat Frame | 53 | Boat Seat |
| 54 | Pontoon | 55 | Rudder |
| 56 | Rudder Blade | 57 | Rudder Shaft |
| 58 | Skeg Extension | 59 | Tiller |
| 60 | Sprocket | 61 | Friction Wheel |
| 62 | Bicycle | 63 | Bicycle Chain |
| 64 | Driven Wheel | | |

DETAILED DESCRIPTION

One embodiment of the watercraft propulsion device is illustrated in FIG. 1 showing an upper right rear perspective view of upper housing 20, comprising upper housing shell 21 with pivot pin hole 25 through channel 24, with handle 22. Upper housing 20 supports drive shaft 26, which runs thru upper pulley 23, connected on both ends to crank arms 27 with pedals 28. Upper pulley 23 is partially encircled by endless loop 32, which partially encircles lower pulley 35 coupled to propeller shaft 38, and attached to propeller 37. Front adjusting tube 30 and rear adjusting tube 31, with thru knobs 29, connect to lower unit 33, with integrated belt restrictor 34 and skeg 36.

FIG. 2 illustrates a lower right rear perspective view of the watercraft propulsion device showing upper housing 20 with front tube support 40, rear tube support 41, endless loop 32, and belt guide 39.

FIG. 3 illustrates an upper right front perspective view of the inside of upper housing 20 with rear tube support 41, locknut 42 on threaded end 43, with handle 22, crank arm 27 and pedal 28.

FIG. 4 illustrates an upper right rear perspective view of upper housing 20 showing drive shaft 26 running through flanged sleeve bearing 44.

FIG. 5 illustrates an upper right rear perspective view of attachment frame 45 with boat frame extension tubes 46 coupled to cross bar 47, adjusting bracket 48, lift tube 49, and pins 50.

FIG. 6 illustrates an upper right front perspective view of attachment frame 45, channel 24, lift tube 49 and pins 50.

FIG. 7 illustrates an upper right front perspective view of pontoon boat 51, having boat frame 52, pontoons 54, boat seat 53, with attachment frame 45 and pin 50.

Another embodiment of the watercraft propulsion device is illustrated in FIG. 8 showing an upper right rear perspective view of rudder 55 connected to upper housing 20 and lower unit 33, with rudder blade 56, rudder shaft 57, handle 22, tiller 59, and skeg extension 58.

An alternative embodiment of the watercraft propulsion device is illustrated in FIG. 9 showing an upper right rear perspective view of upper housing 20, drive shaft 26 with sprocket 60 in place of crank arms 27 and pedals 28 (not shown).

Another alternative embodiment of the watercraft propulsion device is illustrated in FIG. 10 showing an upper right front perspective view of upper pulley 23 (not shown) positioned between two spaced apart friction wheels 61.

Another alternative embodiment of the watercraft propulsion device is illustrated in FIG. 11 showing an upper right front perspective view of upper pulley 23 positioned to one side of two side-by-side friction wheels 61, to provide a larger single friction wheel surface without a space in between the friction wheels 61.

FIG. 12 illustrates a right side view of bicycle 62 showing bicycle chain 63 and driven wheel 64.

Operation—FIGS. 1-7

Pedals 28 are coupled to crank arms 27 which turn drive shaft 26 running through flanged sleeve bearing 44 (FIG. 4) through the sides of upper housing shell 21 to rotate upper pulley 23, pulling endless loop 32 around upper pulley 23 and lower pulley 35 to rotate propeller shaft 38, driving propeller 37 in a circular motion providing propulsion through the water. Note that reverse rotation by the operator on pedals 28 will result in reverse propulsion as expected.

Belt guide 39 (FIG. 2) on the bottom end of upper housing 20, and belt restrictor 34 on the top end of lower unit 33, guide and restrict endless loop 32 over upper pulley 23 and lower pulley 35 so endless loop 32 will align and track correctly over the pulleys.

Front and rear adjusting tubes, 30 and 31, respectively, are joined to lower unit 33 on the lower ends, and adapted with threaded ends 43 (FIG. 3) on the upper ends. A thru knob 29 is twisted onto each of the upper threaded ends 43 of front and rear adjusting tubes, 30 and 31, respectively, until enough of each of the front and rear adjusting tubes, 30 and 31, respectively, are able to slide through holes in front and rear tube supports, 40 and 41, respectively, thereby joining upper housing 20 and lower unit 33 together, with front and rear tube supports, 40 and 41 respectively, resting on top of and are supported from below, by thru knobs 29. While endless loop 32 is connected to upper and lower pulleys, 23 and 35, respectively, thru knobs 29 are turned by the operator to rotate on the threaded ends 43 of front and rear adjusting tubes, 30 and 31, respectively, to adjust the distance between upper housing 20 from lower unit 33, thereby adjusting the distance separating upper and lower pulleys, 23 and 35, respectively, allowing the operator to adjust the proper tensioning of endless loop 32 while in operation, for optimized performance of the drive unit. A locknut 42 is threaded onto the top end of each threaded end 43 on the portion of the front and rear adjusting tubes, 30 and 31, respectively, that protrudes above the front and rear tube supports, 40 and 41, respectively, leaving enough space between the bottom of locknuts 42 and the top of front and rear tube supports, 40 and 41, respectively, to allow ample room for loosening and tensioning endless loop 32 as desired. The purpose of the locknuts 42 is to retain the front and rear adjusting tubes, 30 and 31, respectively, in connection with upper housing 20 in the event endless loop 32 is severed or loosened to the point it can no longer hold upper housing 20 and lower unit 33 together in tension.

Handle 22 allows the propulsion device to be easily carried independent of the watercraft as well as providing a grip for manipulating the device in a tilting manner while installed on a watercraft.

Attachment frame 45 (FIG. 5) is connected to a pontoon boat 51 by inserting the boat frame extension tubes 46 into the existing open-ended tubes of boat frame 52 and fixing in place with pins 50. The propulsion device is connected to attachment frame 45 by coupling channel 24 to lift tube 49 with pin 50 thru pivot pin hole 25. Channel 24 straddles lift tube 49, surrounding it on three sides to prevent the propulsion device from twisting side-to-side while pedaling, while also allowing it to rotate about the axis of pivot pin hole 25 so the propulsion device will tilt up when beaching, striking an underwater obstacle, or when lifted manually by the operator as desired to raise or lower the device.

The height of the drive unit is selectively adjustable by moving lift tube 49 up or down in adjusting bracket 48. The distance of pedals 28 from boat seat 53 is selectively adjustable by sliding boat frame extension tubes 46 in and out of the main tubes of boat frame 52 until the distance is comfortable for the operator, pinning in place with pins 50.

FIG. 8—Additional Embodiment with Rudder

An additional embodiment includes a rudder 55 removably attached to the propulsion device for steering. Rudder shaft 57 runs through holes in handle 22 at the top, and is connected at the bottom to skeg extension 58 which is fixed to skeg 36 (FIG. 1). The rudder blade 56 is turned by moving tiller 59 to either side as desired.

FIGS. 9 & 12—Alternative Embodiment with Sprocket

An alternative embodiment removes pedals 28 and crank arms 27, and couples a sprocket 60 to drive shaft 26, allowing the propulsion device to be powered by a chain 63 from a bicycle 62, or other chain driven mechanism.

FIGS. 10 & 12—Alternative Embodiments with Friction Wheels

Another alternative embodiment removes pedals 28 and crank arms 27, and couples two spaced apart friction wheels 61 to drive shaft 26, with upper pulley 23 (not shown) centered between the two friction wheels 61, allowing the propulsion device to be powered by a driven wheel 64 of a bicycle 62, or other driven wheel as may be appropriate. This embodiment is appropriate for wide wheeled bicycles, like mountain bikes, and other wide driven wheels.

FIGS. 11 & 12—Alternative Embodiments with Friction Wheels

Another alternative embodiment removes pedals 28 and crank arms 27, and couples one or more friction wheels 61 to drive shaft 26, in a side-by-side configuration with upper pulley 23 coupled to drive shaft 26 on either side of friction wheels 61, allowing the propulsion device to be powered by a driven wheel 64 of a bicycle 62, or other driven wheel as may be appropriate. This embodiment is appropriate for narrow wheeled bicycles, like road bikes, and other narrow driven wheels.

CONCLUSION, RAMIFICATIONS AND SCOPE

Thus the reader can see that at least one embodiment of the propulsion device and mounting frame produces a simple and effective device for providing human powered water propulsion for small pontoon boats and water cycles.

While the above description contains many specifics, these should not be construed as limitations on the scope, but rather as an exemplification of one or more embodiments thereof. Many other variations of size, material, shape, and configurations are possible. For example, the upper housing can take a variety of shapes and can be adapted to pedal, sprocket or friction wheel as a means of providing rotation to the drive shaft. The size of many components, such as pulleys, belts, chains, friction wheels, sprockets, knobs, and crank arms can vary. The number and arrangement of friction wheels could vary, for example, to use one or several friction wheels either spaced apart with one or more pulleys in the middle, or with a pulley to either side of one or several friction wheels positioned side-by-side. A variety of suitable structural materials could be employed, including steel, aluminum, plastic, wood, composites, and carbon fiber. And a variety of propeller types, styles, number of blades, and blade pitch could be used. Bearings could be comprised of various materials, and could be sleeve bearings or other types of bearings mounted on the upper housing or inserted into the wall of the upper housing, or no bearings at all if the material used for the upper housing, lower unit, and other components permit. And the propulsion device could be attached to various types and configurations of watercraft, including pontoon boats, water cycles, and amphibious cycles.

Accordingly, the scope should be determined not by the embodiments illustrated, but by the appended claims and their legal equivalents.

I claim:

1. A portable human powered watercraft propulsion device comprising:
   an upper housing comprising an upper housing shell; the upper housing shell comprising at least a left and a right side, and a bottom forward end and a bottom rear end;
   a front tube support at the bottom forward end of said upper housing shell, a rear tube support at the bottom rear end of said upper housing shell, and a belt guide spanning between the bottom sides of said upper housing,
   a drive shaft passing through the sides of said upper housing,
   an upper pulley coupled to said drive shaft inside of said upper housing,
   a pair of crank arms, one each disposed on each end of said drive shaft, outside of said upper housing, wherein said crank arms extend in opposite radial directions from the axis of said drive shaft,
   a pair of pedals, one each joined orthogonally to the ends of said crank arms opposite said crank shaft,
   a front adjusting tube and a rear adjusting tube, each having a first and second end, spaced apart from each other longitudinally along an axis of the sides of said upper housing, the first ends adjustably inserted through the bottom of said front and rear tube supports of said upper housing, whereby said front and rear adjusting tubes slide through said front and rear tube supports,
   a lower unit joined to the second ends of said front and rear adjusting tubes, said lower unit comprising a belt restrictor for guiding an endless loop,
   a propeller shaft oriented with an axis of rotation perpendicular to the axis of rotation of said drive shaft, rotationally coupled to said lower unit, and extending rearward beyond the aft end of said lower unit,
   a lower pulley coupled to said propeller shaft,
   a propeller mounted to the aft end of said propeller shaft,
   said endless loop having generally a 90 degree twist connecting said upper and lower pulleys, whereby rotational movement of said drive shaft is transferred to said propeller shaft, turning said propeller for movement through the water,
   a means for adjustably tensioning said endless loop,
   a means for pivotally coupling to a pontoon boat.

2. The human powered watercraft propulsion device of claim 1 wherein said means for adjustably tensioning said endless loop is a thru knob rotated on each of a threaded end of said first ends of said front and rear adjusting tubes at the bottom of said upper housing, wherein the distance between said upper housing and said lower unit is selectively variable by twisting said thru knobs on said threaded ends causing said endless loop to be tensioned between said upper and lower pulleys as desired.

3. The human powered watercraft propulsion device of claim 1 wherein said means for pivotally coupling to said pontoon boat comprises:
   a pivot pin hole,
   a pivot pin,
   an attachment frame coupled to said pontoon boat, wherein said watercraft propulsion device is pivotally coupled to said attachment frame joined to said pontoon boat.

4. The human powered watercraft propulsion device of claim 3 wherein said watercraft propulsion device will rotate about said pivot pin in a rearward swinging vertical arc upon beaching or striking an underwater obstacle.

5. The human powered watercraft propulsion device of claim 1 comprising:
   a means for steering.

6. The human powered watercraft propulsion device of claim 5 wherein said means for steering is a rudder removably attached to said upper housing and said lower unit.

7. The human powered watercraft propulsion device of claim 1 in combination with a bicycle comprising:
   a sprocket suitable for connection to a bicycle chain mounted on one end of said drive shaft in place of said crank arms and said pedals, whereby said sprocket and said drive shaft are rotated by said bicycle chain of said bicycle.

8. The human powered watercraft propulsion device of claim 1 in combination with a bicycle comprising:
   said crank arms and said pedals removed from said crank shaft,
   at least one friction wheel mounted on said drive shaft, wherein said drive shaft is rotated by result of direct contact between said friction wheel and a driven wheel of said bicycle.

9. The human powered watercraft propulsion device of claim 1 wherein said propeller is a shrouded propeller.

* * * * *